United States Patent [19]

Reng

[11] Patent Number: 4,988,940

[45] Date of Patent: Jan. 29, 1991

[54] METHOD FOR THE FORMATION OF THE ACTUAL LOAD ANGLE VALUE FOR A FIELD-ORIENTED REGULATED ROTARY FIELD MACHINE AND CORRESPONDING REGULATION

[75] Inventor: Leonhard Reng, Herzogenaurach, Fed. Rep. of Germany

[73] Assignee: Siemens Aktiengesellschaft, Berlin & Munich, Fed. Rep. of Germany

[21] Appl. No.: 530,441

[22] Filed: May 29, 1990

Related U.S. Application Data

[63] Continuation of Ser. No. 295,225, Jan. 9, 1989, abandoned.

[30] Foreign Application Priority Data

Jan. 29, 1988 [DE] Fed. Rep. of Germany ....... 3802704

[51] Int. Cl.$^5$ .............................................. H02P 5/40
[52] U.S. Cl. ..................................... 318/800; 318/805
[58] Field of Search ......... 318/800, 803, 805, 807–811

[56] References Cited

U.S. PATENT DOCUMENTS

| | | | |
|---|---|---|---|
| 4,310,791 | 1/1982 | Akamatsu | 318/809 |
| 4,330,741 | 5/1982 | Nagase et al. | 318/809 |
| 4,338,559 | 6/1982 | Blaschke et al. | 318/805 |
| 4,626,761 | 12/1986 | Blaschke | 318/805 |
| 4,764,712 | 8/1988 | Blaschke et al. | 318/805 |

*Primary Examiner*—David Smith, Jr.
*Attorney, Agent, or Firm*—Kenyon & Kenyon

[57] ABSTRACT

A method for the formation of the actual load angle value for a field-oriented regulated rotary field machine and apparatus for field-oriented regulation of the machine. In order to impress in a voltage-impressing converter the load angle, i.e. the angle between field axis and stator current vector, an angle regulator is used to which a given nominal load angle value (wif*) is supplied. In order to form from the stator-oriented acutal current angle (wis) tapped off at the machine via a current detector (I-DET) the actual load angle value associated the nominal load angle value with wif*, by a decoupling computing unit (CAL) from the given components of the field-oriented nominal current vector, the field-oriented angle (wuf*) of the associated field-oriented nominal voltage vector is calculated and subtracted from the stator-oriented angle (wus) of the actual voltage vector. The actual load angle value (wif) is then given by wis−wus+wuf*. The output signal of the angle regulator (W-REG) and the decoupling computing unit (CAL) form the input quantities of the trigger unit for a voltage-impressing converter (PWR) feeding the machine at which the stator-oriented voltage angle (wus) can be tapped off.

2 Claims, 2 Drawing Sheets

METHOD FOR THE FORMATION OF THE ACTUAL LOAD ANGLE VALUE FOR A FIELD-ORIENTED REGULATED ROTARY FIELD MACHINE AND CORRESPONDING REGULATION

This application is a continuation of application Ser. No. 295,255, filed Jan. 9,1989.

BACKGROUND OF THE INVENTION

The present invention relates to a method for the formation of the actual load angle value for a field-oriented regulated rotating field machine and to a field-oriented regulating device for a converter-fed rotating field machine.

In "Siemens Forschungs- und Entwicklungsberichte", (1972), pages 184 to 193 it is explained that it is advantageous for the regulation of a speed-changeable polyphase machine, in a system of coordinates rotating synchronously with the field axis, to preset a nominal current vector on whose angle then the angle of the rotating field axis is coupled which corresponds to a rotation of the nominal current vector about the field angle, i.e. a transformation of the coordinates from a field-oriented system of coordinates into the stator-oriented system of coordinates. The thereby formed stator-oriented nominal current vector is then impressed on the machine via the converter.

In the case of a voltage-impressing converter, for example, a direct ac converter or an intermediate circuit converter with impressed intermediate circuit dc voltage, it is provided in illustration 16 of the Siemens referral to form from the given nominal current vector in a subsequent decoupling numerical processing unit in the field-oriented system of coordinates the defining quantity of a field-oriented nominal voltage vector which subsequently through appropriate vector rotation is transformed into the stator-oriented system of coordinates in order to supply the stator-oriented nominal voltage values for the converter.

So that the actual current vector corresponding to the fed- in phase currents which can be detected by a current detector connected to the machine coincides with the fieldoriented given nominal current vector, a regulating device is provided which with its nominal value input is connected to the input device for the field-oriented nominal current vector and with its actual value input (via a vector rotator for transformation from stator reference system into the field reference system) to the current detector. In the known case the vector output signal of the regulating device is fed into the decoupling circuit in order to form the nominal voltage vector required for impressing the field-oriented nominal current vector which after transformation in stator coordinates is supplied to the stator-oriented nominal voltage vector for controlling the converter.

SUMMARY OF THE INVENTION

With field-orientation it is achieved that the field-parallel and the field-perpendicular components of the nominal current vector can be impressed on the machine independently of each other. The field-parallel component which corresponds to the field current of a dc current machine can be controlled or regulated, and thus and the flow of the machine can be adjusted to the desired value. The field-perpendicular component permits adjusting the turning moment to a controlled or (for example by means of a speed regulator) regulated given nominal value.

The above and other objects of the invention are achieved by a method for the formation of an actual load angle value for field-oriented regulation of a rotary field machine, comprising the steps of forming from a field-oriented nominal voltage vector, a direction of the field-oriented nominal voltage vector, forming from an angle difference between a stator-oriented actual voltage vector and the field-oriented nominal voltage vector, a stator-oriented field angle, and forming from the difference of a measured stator-oriented angle of the actual stator current vector and the stator-oriented field angle the actual load angle value.

In the case described up to now of current impression in a voltage-impressing converter, current regulation for the two orthogonal (cartesian) components of the current vector was used. It is, however, also possible through a cartesian/polar coordinate conversion to form from the field-oriented nominal current components the nominal load angle and undertake a regulation of the load angle, i.e. the angle between the stator current vector and the flux vector (in particular the rotor flux vector). However, neither the flux vector itself nor the angle between it and the stator current vector is accessible to direct measurement but must be determined through calculations, for example via the stator voltage vector and the stator current vector.

BRIEF DESCRIPTION OF THE DRAWINGS

The invention will be described in greater detail in the following detailed description with reference to the drawings, in which.

DETAILED DESCRIPTION

Figure 1:
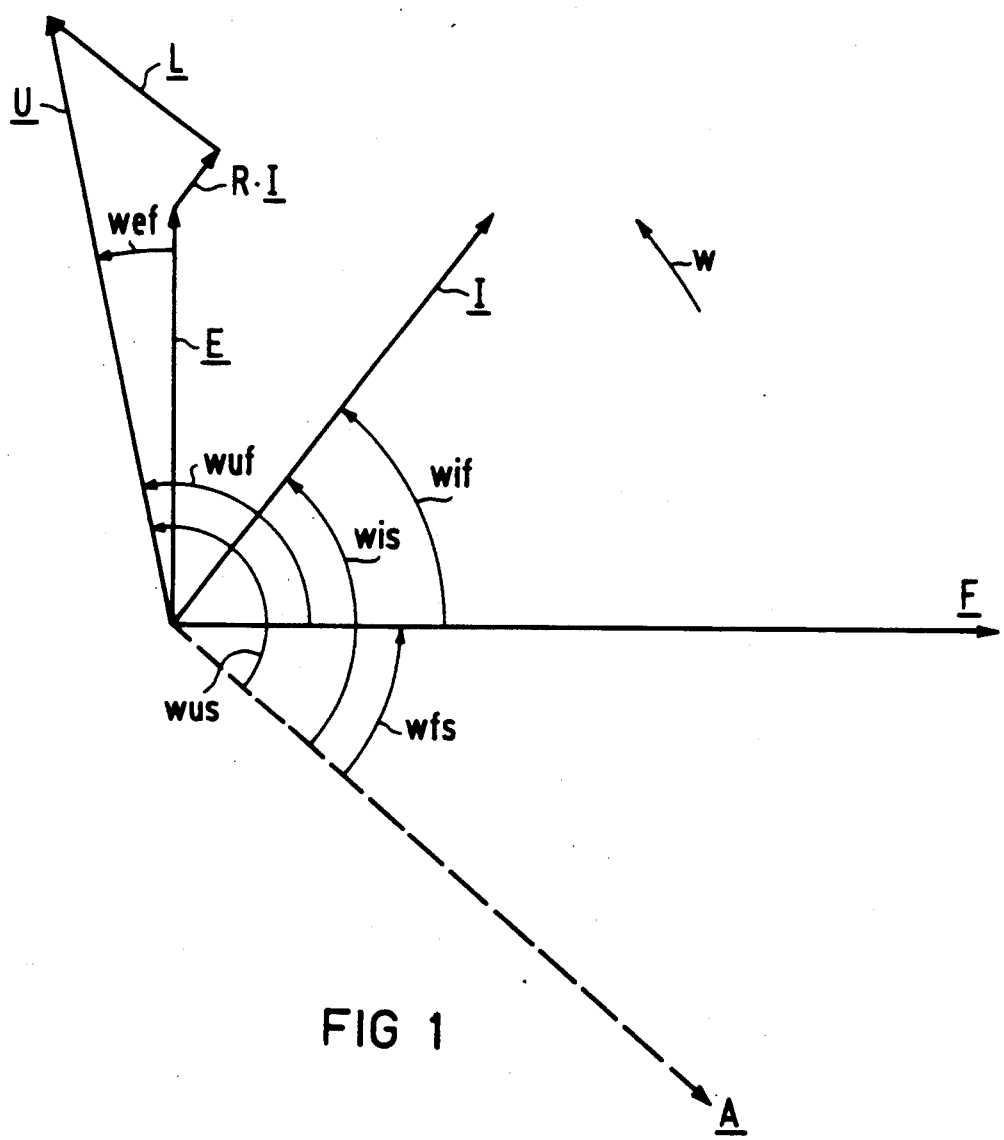
FIG. 1 shows an orthogonal system of coordinates.

FIG. 1 shows in an orthogonal system of coordinates whose one axis coincides with the flux vector F, the stator voltage vector U and the stator current vector I of a rotary field machine. By A is denoted the stator axis which, hence, defines the resting stator reference system in which the actual current vector I and the voltage vector U fed in by the power converter can be measured. The flux vector F rotating with frequency w encloses thus with the stator axis A the angle wfs, where w=d (wfs)/dt.

In FIG. 1, further, the angles wis and wus are represented which are formed by vectors I and U with the stator axis A. Angles wif and wuf denote the corresponding angles with respect to the field axis F.

Figure 2:
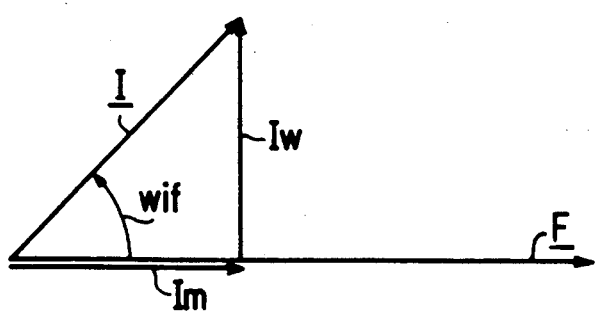
FIG. 2 shows the current vector I.

FIG. 2 shows the current vector I with respect to field axis F and its resolution into the field-parallel component Im., which in the stationary state corresponds to the inductance of the rotor, and is proportional to the flux. Iw denotes the field- perpendicular current component which determines the turning moment, Where $Iw = |I| \cdot \sin(wif)$ and $Im = |I| \cdot \cos(wif)$.

Between the flux vector F and the EMF vector E induced by the flux the relationship $E = d(F)/dt$ applies, where the EMF vector E results from the current vector U by subtraction of vector R . I for the ohmic voltage drop in the stator and a vector L which is perpendicular to the current vector I and for which applies $|L|=L.w.|I|$, where L is the stray inductance parameter.

It is thus possible, for example, to calculate in a model of the machine from the parameters R and L as well as vectors U and I the vectors E and F so that the field angle wfs can also be calculated. Thus, the load angle is obtained $$wif = wis - wfs$$

which is to be impressed on the machine through the fieldoriented regulation.

The phase of the voltage fed in, i.e. angle wus, is measurable directly and in voltage-impressing converters, whose trigger equipment operates with an appropriate signal, can also be tapped off at the trigger unit. Therefore, frequently a simplified regulating concept is applied in which the current is not oriented to the flux vector but to the voltage vector. The corresponding orientation loss angle wef is also shown in FIG. 1 and rests primarily on the neglect of the stray voltage drop. This increases monotonically with the load so that the error control increasess correspondingly. For operating points of great load an improved approximation can be obtained if for large angles wif the effective current Iw is set approximately equal to the current quantity $|I|$.

The invention is based on the task of determining in a load angle regulation the load angle wif in as simple a manner as possible, in particular without using a machine model processing the actual electrical values of the machine.

The invention assumes that in decoupling numerical processors which are required in any case for the field-oriented regulation of a rotating field machine with a voltage-impressing converter, the field-oriented nominal voltage value wuf*, i.e. the nominal value for the angle wuf, is available and, on the other hand, the stator-oriented actual voltage angle wus is readily available. If, therefore, in the angle relation wfs=wus−wuf, instead of the actual angle wuf the nominal value wuf* is substituted, then for the field angle wfs and the load angle wif the relationships result:

$$wi = wis - wfs,$$

$$wfs = wus - wuf*.$$

This leads to a method for determining the actual load angle value and a field oriented regulating device for the rotating field machine. In conjunction with a further figure the invention will be explained in greater detail.

Figure 3:
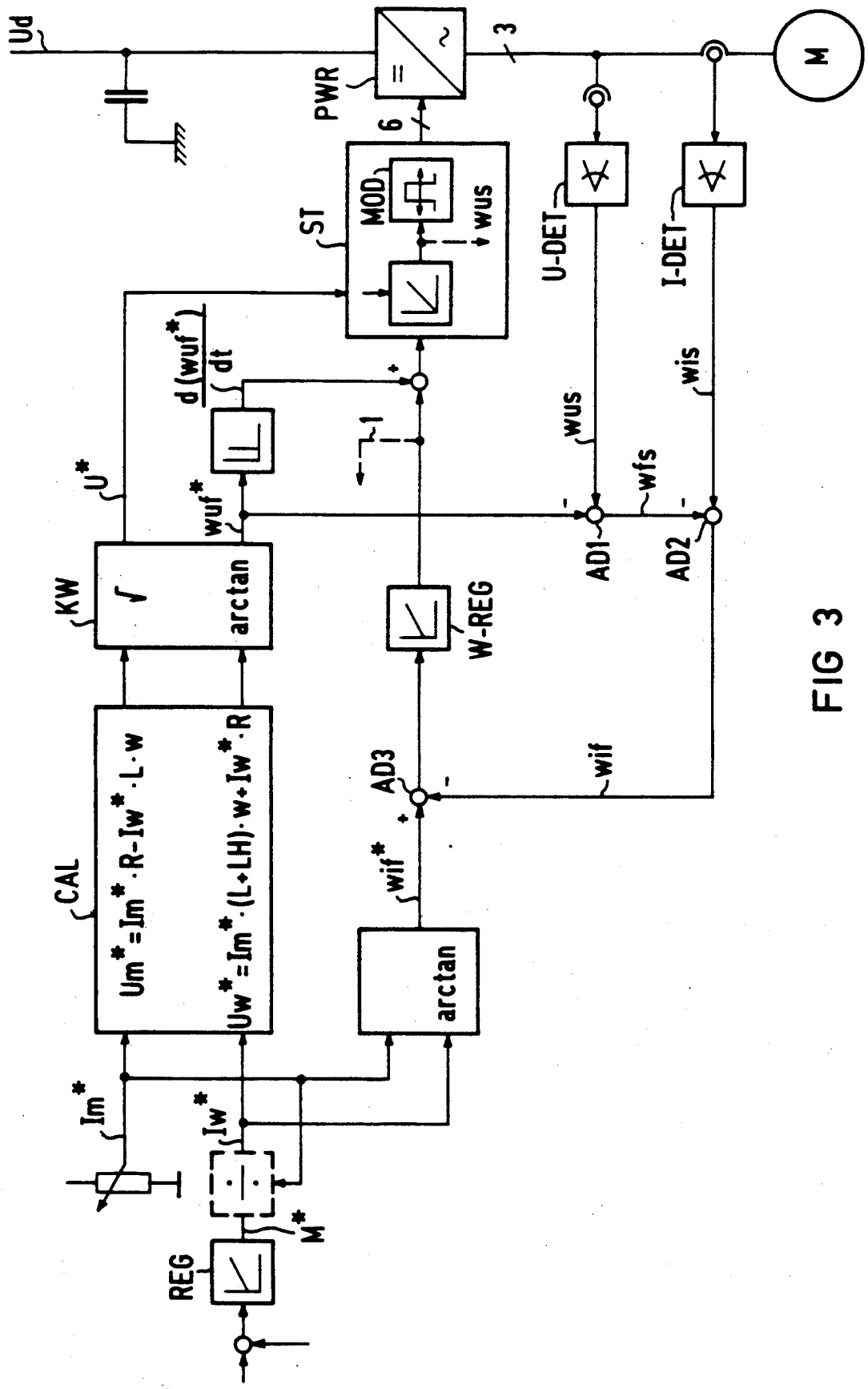
FIG. 3 shows a block diagram of the invention coupled to a rotary field machine M.

In FIG. 3, the rotary field machine M is fed by an inverting pulse rectifier PWR which is connected to a dc distribution voltage Ud. The converter PWR receives the trigger pulses for its gates from a trigger unit ST which in the represented case has a frequency input and a quantity input in order to form the trigger signals through integration of frequency and multiplication with the quantity reference curves for the phase voltages of the machine which subsequently are modulated in a modulator MOD with respect to pulse widths.

For triggering of trigger unit ST a field-oriented nominal current vector I* is given at an input device in the form of two orthogonal nominal current component values, Im* and Iw*. The nominal value Im* for the component parallel to the field axis can, for example, be tapped off at a potentiometer and is proportional to the quantity of the flux desired.

Since the turning moment M is proportional to the vector product of flux and current, the field-perpendicular nominal component value Iw* can be formed as quotient of a nominal moment value M* and the flux from the output signal of a speed regulator REG which determines from the regulation deviation of the actual speed value from a given nominal speed value the nominal turning moment M* which is required for maintaining the nominal speed value. As actual replacement speed value the frequency of the converter can be tapped off at the trigger unit and fed back (line 1).

Taking into consideration parameters for the stator resistance R, the stray inductance L, and the main inductance, a decoupling computer representing a model of the machine can calculate the current voltage vector U* associated with the nominal current vector I*. Advantageously only the stationary relationships between current and voltage are taken into consideration as they are represented in FIG. 1. Accordingly, the following are obtained for the field-parallel component Um* of the corresponding voltage vector −U* and the field-perpendicular component Uw* of this nominal vector:

$$Um* = R.Im* - L.w.Iw*$$

$$Uw* = (L + LH).w.Im* + R.Iw*.$$

LH is the main inductance, L the stray inductance, and R the stator resistance of the machine. The value w indicates per se the flux frequency represented in FIG. 1, which, for example, can be formed from the output signal of the adder AB1 by differentiation. But the field frequency is nearly equal to the converter frequency itself and can, therefore, be fed back from the frequency trigger control input of the trigger unit ST.

A coordinate resolver KW transforms the cartesian field-oriented components Um*, Uw* into the polar quantity component $U* = (Uw*^2 + Um*^2)^{\frac{1}{2}}$ and the field-oriented angle component wuf*=arc tan Uw*/Um*. The quantity U* of the nominal voltage vector is supplied to the quantity input of the trigger unit while the time derivative d(wuf*)/dt of angle wuf* together with the output signal of an angle regulator W-REG is impressed on the frequency control input.

The control path described up to now ensures that the machine M is impressed with a current corresponding to the amount of the field-oriented nominal current vector. The phase position of the current is given by the angle regulator W-REG so that the actual load angle value wif coincides with the nominal load angle value, i.e. the nominal current angle value wif*, which describes the direction of the nominal current vector relative to the field axis. While this field-oriented nominal current angle value can be formed through cartesian/polar coordinate transformation according to wif=arc tan (Iw*/Im*) from the cartesian nominal component values Im*, Iw* of the field-oriented nominal current vector, only the stator-oriented actual current angle can be determined by means of a current detector I-DET connected to the phase lines of the rotary current machine, i.e. the angle wis which encloses the actual current vector I of FIG. 1 with the stator axis A. The load angle Wif is, however, determined by the difference of the stator-oriented actual current angle wis and the field angle wfs.

This field angle is now to be detected in simple manner without use of measuring probes or a machine model. To this end, by means of a voltage- detector U-DET at the machine terminals, the stator-oriented voltage angle, i.e. the angle wus which the actual voltage vector U of FIG. 1 forms with the stator axis A, is detected and subtracted from the field-oriented nominal voltage angle wuf* (adder site AD1). Thus it comes about that the angle regulator W-REG is preceded at the input by a computer with two nominal value inputs and two actual value inputs, where one nominal value input is impressed by the adjusting device for the field-oriented nominal current vector with wif*, the other nominal value input by the decoupling computer CAL with wuf*, while to the actual value inputs the two actual angles wus and wis of detectors U-DET and I-DET are supplied.

The voltage detector U-DET can frequently be omitted if the corresponding actual angle wus can already be tapped off at the trigger unit ST.

In the stationary state the angle wfs calculated in this manner is identical with the actual field angle. In dynamic processes, however, temporarily an orientation loss angle can occur. Overall a high utiliization of the machine and the converter as well as a very precise maintenance of the stationarily given nominal values are achieved.

Instead of angle wif* an angle-like nominal value, for example the field-perpendicular nominal current value component Iw* can be used and supplied to adder AD3 in the adder unit. To the actual value input of this adder AD3 then the angle-like actual value $Iw = |I| \cdot \sin(wis)$ is supplied. If as current detector I-DET a 3/2 converter is used which converts the measured values of the phase current into orthogonal components, and a subsequent cartesian/polar coordinate resolver which calculates the amount $|I|$ of the actual current vector I, then from wif and $|I|$ by means of a multiplying sine function generator the corresponding actual value can be formed.

If for the regulation microcomputers are used, then the variant shown in FIG. 3 is, however, frequently more advantageous, since vector calculation operations can be particularly simply carried out digitally in polar coordinates.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for the formation of an actual load angle value (wif) for field-oriented regulation of a converter-fed rotating field machine (M), comprising the steps of forming from a field-oriented actual current vector (I*) which is available in the form of two orthogonal actual current component values ($I^*_m$, $I^*_w$), said rotating field machine having a stator-resistance (R), a scatter inductivity (L) and a main inductivity (LH), two orthogonal nominal voltage component values ($U^*_m$, $U^*_w$) of a field-oriented nominal voltage value (U*) for the converter (PWR), said two orthogonal nominal voltage component values being calculated by a decoupling computing unit (CAL), determining from measured phase currents and measured phase voltages respective orthogonal actual current component values and orthogonal actual voltage component values, calculating from said orthogonal actual current component values an orthogonal actual voltage component values a respective stator-oriented actual current angle (wis) and a stator-oriented actual voltage angle (wus), calculating from the calculated nominal voltage component values ($U^*_m$, $U^*_w$) a field-oriented nominal voltage component value ($U^*_m$, $U^*_w$) (wuf*), deducting the field-oriented nominal voltage component value from the determined stator-oriented actual voltage angle (wus), resulting in a stator-oriented field angle (wfs), deducting the stator-oriented field angle from the determined stator-oriented actual current angle (wis), resulting in the actual load angle value (wif).

2. A field-oriented regulator for a converter-fed rotating field machine comprising a decoupling computing unit (CAL) having an output coupled to a coordinate transformer (KW), an output of the coordinate transformer being coupled to a control unit (ST) for the control of the converter (PWR), further comprising a further coordinate transformer (output wif*), an angle regulator (W-REG), a current detector (I-DET) and a voltage detector (U-DET), a first input of the decoupling computing unit (CAL) being coupled to a setting means (output Im*) and further being coupled to a first input of the further coordinate transformer (output wif*), a second input of the decoupling computing unit (CAL) being connected to an output of a speed regulator (REG) loaded with a speed difference signal and further being coupled to a second input of the further coordinate transformer (output wif*), inputs of the current detector (I-DET) and the voltage detector (U-DET) being respectively coupled to phase lines of a supply network, the control unit (ST) having an input coupled to said output of said coordinate transformer (KW) and having an output coupled to the converter (PWR), and further comprising a calculating stage comprising three adders (AD1, AD2, and AD3) having two nominal value inputs and two actual value inputs, the first of said adders (AD1) having a negative input forming the first nominal value input and being coupled to a second output of the coordinate transformer (KW), a positive input of the first and of the second adders (AD1, AD2) comprising the first and second actual value inputs, the first actual value input being coupled to an output of the voltage detector (U-DET) and the second actual value input being coupled to an output of the current detector (I-DET), an output of the first adder (AD1) being coupled to a negative input of the second adder (AD2), an output of the second adder (AD2) being coupled to a negative input of the third adder (AD3), the third adder having a positive input forming the second nominal value input and being coupled to an output of the further coordinate transformer (output wif*), the calculating stage having an output formed by an output of the third adder (AD3), the output of the third adder being coupled to an input of the angle regulator (W-REG), said angle regulator having an output coupled to an input of a further adder, said further adder having a further input coupled to the second output of said coordinate transformer (KW), an output of said further adder being coupled to a frequency control input of the control unit (ST).

* * * * *